US012270368B2

(12) United States Patent
Rasmussen

(10) Patent No.: US 12,270,368 B2
(45) Date of Patent: Apr. 8, 2025

(54) SYSTEMS AND METHODS FOR SUBTERRANEAN ENERGY STORAGE

(71) Applicant: John Dane Rasmussen, Wembley (AU)

(72) Inventor: John Dane Rasmussen, Wembley (AU)

( * ) Notice: Subject to any disclaimer, the term of this patent is extended or adjusted under 35 U.S.C. 154(b) by 264 days.

(21) Appl. No.: 18/161,686

(22) Filed: Jan. 30, 2023

(65) Prior Publication Data

US 2023/0243330 A1 Aug. 3, 2023

Related U.S. Application Data

(60) Provisional application No. 63/305,708, filed on Feb. 2, 2022.

(51) Int. Cl.
*F03B 13/06* (2006.01)
*E21B 43/12* (2006.01)
*E21F 15/10* (2006.01)

(52) U.S. Cl.
CPC .............. *F03B 13/06* (2013.01); *E21B 43/12* (2013.01); *E21F 15/10* (2013.01)

(58) Field of Classification Search
CPC ........... F03B 13/06; E21F 17/16; E21F 15/10; E21B 43/12
See application file for complete search history.

(56) References Cited

U.S. PATENT DOCUMENTS 4,182,128 A * 1/1980 Gardner .................. F03B 13/06 60/398
4,248,305 A 2/1981 Scarborough et al.
5,839,508 A 11/1998 Tubel et al.
6,396,162 B1 5/2002 Carrillo
7,001,261 B2 2/2006 Johnson et al.
7,165,882 B2 1/2007 Della Santa
(Continued)

FOREIGN PATENT DOCUMENTS

DE 102011107385 1/2013
DE 102011112409 3/2013
(Continued)

OTHER PUBLICATIONS

Martin, G.D, Aquifer Underground Pumped Hydroelectric Energy Storage (Masters Thesis), 2007.
(Continued)

*Primary Examiner* — Benjamin F Fiorello
(74) *Attorney, Agent, or Firm* — Dentons Bingham Greenebaum LLP; Brian W. Chellgren

(57) ABSTRACT

The present invention relates to systems and methods for subterranean energy storage. The systems and methods involve a higher-pressured subterranean rock formation in fluid communication with a lower-pressured subterranean rock formation via a controllable fluid channel intersecting both formations. Potential energy is converted to electrical energy by allowing fluid to flow from the higher-pressured formation to the lower-pressured formation through a turbine in fluid communication with the fluid channel. The system is recharged by pumping fluid from the lower-pressured subterranean rock formation to the higher-pressured subterranean rock formation using a pump in fluid communication with the fluid channel.

22 Claims, 7 Drawing Sheets

(56) References Cited

U.S. PATENT DOCUMENTS

| | | | | |
|---|---|---|---|---|
| 7,656,050 | B2 | 2/2010 | Riley | |
| 8,215,104 | B2 | 7/2012 | Riley | |
| 9,500,203 | B2 | 11/2016 | Baski | |
| 2002/0180215 | A1 | 12/2002 | Mitchell | |
| 2005/0012340 | A1 | 1/2005 | Cousins | |
| 2009/0085353 | A1 | 4/2009 | Riley | |
| 2009/0121481 | A1 | 5/2009 | Riley | |
| 2009/0212573 | A1 | 8/2009 | Riley | |
| 2010/0077749 | A1 | 4/2010 | Riley | |
| 2011/0155393 | A1 | 6/2011 | Loretz et al. | |
| 2011/0233937 | A1 | 9/2011 | Riley | |
| 2012/0199354 | A1* | 8/2012 | Kaminsky | F03G 7/04 166/57 |
| 2012/0285539 | A1 | 11/2012 | Riley | |
| 2014/0013744 | A1* | 1/2014 | Burkhardt | F24T 10/30 60/641.2 |
| 2016/0153239 | A1 | 6/2016 | Randall | |
| 2016/0160619 | A1 | 6/2016 | Randall | |
| 2016/0341065 | A1 | 11/2016 | Farb et al. | |
| 2017/0234289 | A1 | 8/2017 | Franck | |
| 2019/0078014 | A1* | 3/2019 | Schmidt | C09K 8/512 |
| 2023/0059338 | A1* | 2/2023 | Miller | F24T 10/20 |

FOREIGN PATENT DOCUMENTS

| | | | |
|---|---|---|---|
| EP | 0196690 | 10/1986 | |
| EP | 2538072 | 12/2012 | |
| EP | 2420668 | 9/2014 | |
| EP | 3660263 | 6/2020 | |
| GB | 2532744 | 6/2016 | |
| WO | WO-0196736 A1 * | 12/2001 | F03B 13/06 |
| WO | 2012054512 | 4/2012 | |
| WO | 2012103591 | 8/2012 | |
| WO | 2017147029 | 8/2017 | |
| WO | 2020111947 | 6/2020 | |
| WO | 2021015624 | 1/2021 | |

OTHER PUBLICATIONS

Society of Petroleum Engineers paper 142361—Enhancement of Oil Recovery through "Dump-flood" Water Injection Concept in Satellite Field. Wafa Shizawi et al. Paper presented at the SPE Middle East Oil and Gas Show and Conference, Manama, Bahrain, Sep. 2011. Paper No. SPE-142361-MS https://doi.org/10.2118/142361-MS Published: Sep. 25, 2011.

ISR/WO pertaining to International application No. PCT/IB2023/000042 to Rasmussen, John Dane, International filing date Jan. 30, 2023. ISR/WO mailed May 23, 2023.

* cited by examiner

SYSTEMS AND METHODS FOR SUBTERRANEAN ENERGY STORAGE

CROSS-REFERENCE TO RELATED APPLICATION

This application claims the benefit of priority to U.S. provisional patent application Ser. No. 63/305,708, filed Feb. 2, 2022, for SYSTEMS AND METHODS FOR SUBTERRANEAN ENERGY STORAGE, incorporated herein by reference.

FIELD OF THE INVENTION

The present invention relates to systems and methods for subterranean energy storage. The systems and methods involve a higher-pressured subterranean rock formation in fluid communication with a lower-pressured subterranean rock formation via a controllable fluid channel intersecting both formations. Potential energy is converted to electrical energy by allowing fluid to flow from the higher-pressured formation to the lower-pressured formation through a turbine in fluid communication with the fluid channel. The system is recharged by pumping fluid from the lower-pressured subterranean rock formation to the higher-pressured subterranean rock formation using a pump in fluid communication with the fluid channel.

BACKGROUND OF THE INVENTION

Intermittent renewable energy sources such as wind power and solar power contribute an increasing proportion of total power input for many electricity grids. However, with the intermittent nature of these energy sources, long duration energy storage (i.e., energy storage for at least 10, at least 20, at least 50, or at least 100 hours) has been identified as critical for grid stability. Lithium-ion batteries are a proven technology and may be deployed at scale, but are typically designed for shorter duration energy storage (e.g., 0.5 to 4 hours) and may be cost-prohibitive for long duration energy storage.

The most common long duration energy storage technology used today is pumped hydroelectric schemes, where water is pumped between dam reservoirs at different elevations to store energy. This energy is retrieved by allowing the same water to flow down through a turbine. While a proven technology, and capable of storing very large quantities of energy, pumping water between reservoirs at different elevations is dependent on suitable topography and availability of large quantities of water. Even with suitable topography, pumped water energy storage often faces other challenges including long construction times, potentially negative environmental impact on watersheds, and evaporation losses.

Subterranean energy storage has been explored as a potential means for storing energy while avoiding impact on watersheds and evaporation losses. Compressed air energy storage is one of the more advanced of these technologies and involves pumping compressed air into suitable underground rock formations (e.g., salt caverns), then allowing the air to decompress and flow through a turbine to generate electricity.

Other technologies use water as the working fluid but often require two wells connected either underground or at the surface. Such technologies may involve pumping water from a first rock formation to the surface through a first well, storing the water on the surface, then allowing the water to fall through a turbine down a second well to a second rock formation. Yet another underground energy storage technology involves injecting water stored on the surface into a permeable rock formation and then back-flowing this water through a turbine to retrieve the stored energy. While this energy storage technology may only require one well, it requires surface water storage facilities such as a pond or tank.

The inventor of the present disclosure realized that improvements in subterranean energy storage systems and methods are needed to avoid the use of a second well and avoid the use of surface-level fluid storage facilities, both to reduce costs and to reduce the surface-level impact of the energy storage systems and methods. Certain preferred features of the present disclosure address these and other needs and provide other important advantages.

SUMMARY

In some embodiments, the present disclosure includes a subterranean energy storage system including a bore hole including an interior, the bore hole extending between a higher-pressured subterranean rock formation and a lower-pressured subterranean rock formation, wherein the higher-pressured subterranean rock formation and the lower-pressured subterranean rock formation are substantially hydraulically isolated from each other except via the fluid channel, and wherein the higher-pressured subterranean rock formation has a higher pressure than the lower-pressured subterranean rock formation when corrected to a common depth; a first opening allowing fluid communication between the interior and the higher-pressured subterranean rock formation; a second opening allowing fluid communication between the interior and the lower-pressured subterranean rock formation; a fluid channel extending substantially parallel to the bore hole within the interior; a packer positioned in the interior, the packer radially surrounding the fluid channel and blocking fluid transfer along the bore hole except through the fluid channel, wherein the packer is positioned at a depth between the first opening and the second opening, dividing the interior into a first cavity in fluid communication with the higher-pressured formation and a second cavity in fluid communication with the lower-pressured formation; a first controllable access in fluid communication with the first cavity and the fluid channel; and a turbine within the fluid channel. In further embodiments, the system further includes a second controllable access in fluid communication with the second cavity and the fluid channel. In certain embodiments, the turbine is a pump as turbine.

In some embodiments, the present disclosure includes a method comprising enabling fluid to flow substantially under the influence of a pressure differential from a higher-pressured subterranean rock formation, through a fluid channel including a turbine, into a lower-pressured subterranean rock formation; converting, in the turbine, kinetic energy of the flowing fluid into electrical energy; and pumping fluid through the fluid channel from the lower-pressured subterranean rock formation, through the fluid channel, into the higher-pressured subterranean rock formation; wherein the higher-pressured subterranean rock formation and the lower-pressured subterranean rock formation are substantially hydraulically isolated from each other except via the fluid channel; and wherein the higher-pressured subterranean rock formation has a higher pressure than the lower-pressured subterranean rock formation when corrected to a common depth.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example only, and are not to be construed as limiting the scope of this invention.

DETAILED DESCRIPTION OF THE PREFERRED EMBODIMENTS

Figure 1:
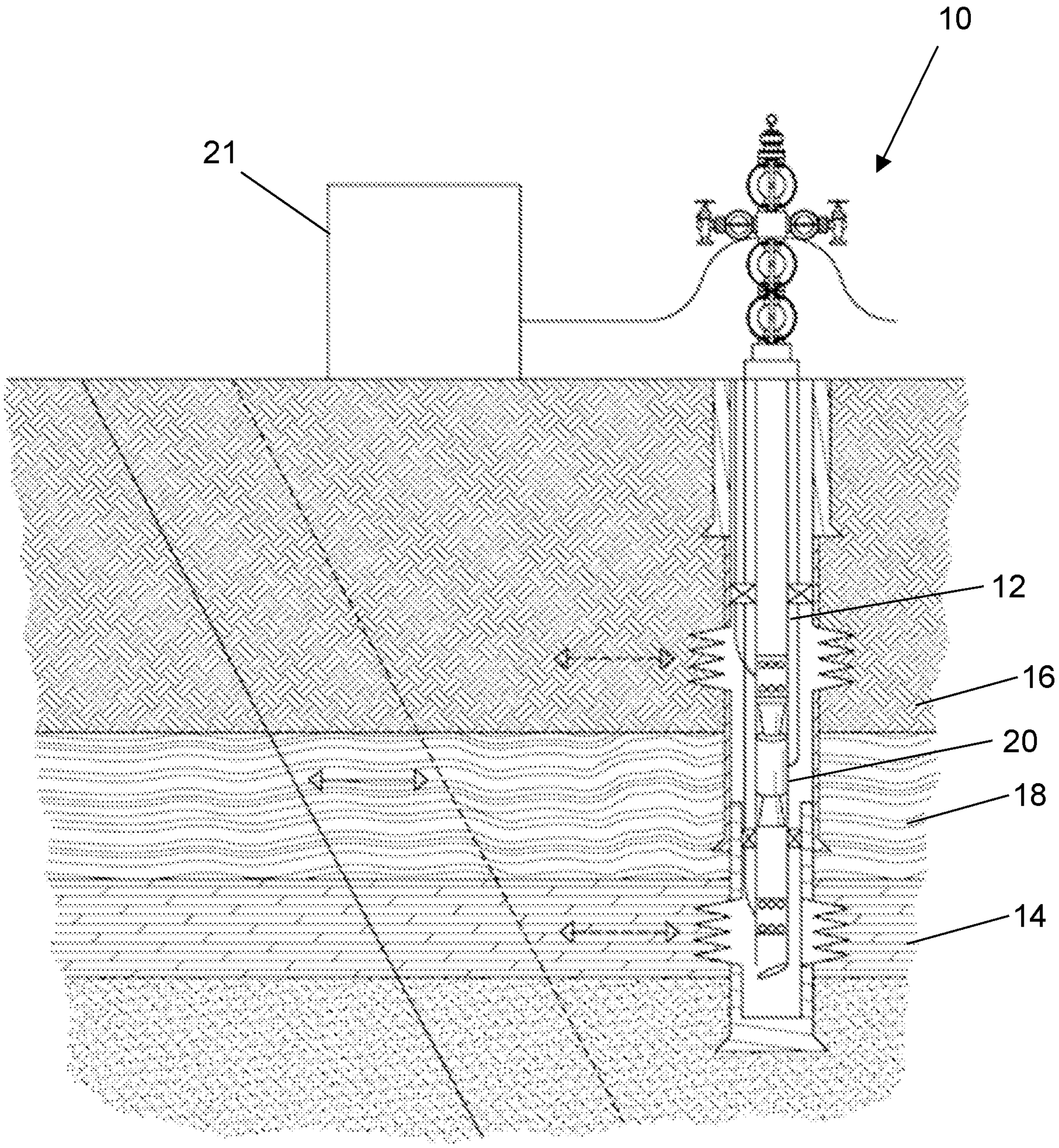
FIG. 1 depicts a method of using a first embodiment of a subterranean energy storage system.

For the purposes of promoting an understanding of the principles of the invention disclosed herein, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein; such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated. The terms "about" or "approximately," unless defined otherwise, refer to a range within ten percent of the most precise digit in the stated value (e.g. "about 1" refers to the range of 0.9 to 1.1, while "about 1.1" refers to the range of 1.09 to 1.11). It should be understood that the drawings in this application are schematic in nature and do not represent the spatial dimensions of the elements depicted therein.

Formations in the Earth's lithosphere over depths commonly investigated for water, mineral and hydrocarbon resources (immediately subsurface to about 8 miles in depth) are pressurized to different magnitudes depending on numerous factors including, but not limited to, the temperature gradient, rock type, adjacent formations, plate tectonics, in-situ liquids, erosion and other geological processes. A normal 'hydrostatic' gradient is a pressure gradient equivalent to a column of fresh water (0.433 psi/ft or 0.0295 atm/ft). A formation said to be 'normally' pressured will have a liquid pressure at any given depth consistent with this pressure gradient. A formation 'under-pressured' will have a liquid pressure gradient less than 0.433 psi/ft while an over-pressured formation will exceed this value. In the most extreme case, formation liquid pressure said to be 'geo-pressured' approaches the pressure gradient exerted by the overlying rock, approximately 1.0 psi/ft.

While geological processes dictate the initial pressure of any rock formation, human activity can also significantly increase or decrease the pressure over time. These activities include water extraction or injection for agriculture, industry and hydrocarbon extraction. It is not uncommon for oil and gas reservoir pressure to decline tens or even hundreds of atmospheres during exploitation. Similarly, formation pressure can increase significantly by injecting fluid, such as water, from the surface. It is also not uncommon for formations with natural or induced pressure differences to occur in close proximity provided they are isolated by a sufficient hydraulic barrier (for example, a substantially impermeable shale layer positioned between the formations).

The stored potential energy due to the pressure differential in such formations can be considerable. A 10,000 $m^3$ (approximately 63,000 barrels) volume of water allowed to drop in pressure by 204 atm (approximately 3,000 psi) will release approximately 57.4 MWh of kinetic energy as it flows from the higher-pressured formation to the lower-pressured one (ignoring any hydraulic inefficiencies such as frictional pressure in the system). While the initial static pressure difference between formations will vary considerably, this example highlights the significant potential energy stored in the subsurface formations if conditions are favorable. It may be advantageous to artificially increase or decrease the pressure in one or both formations such that a sufficient pressure difference exists to store energy. This could be achieved by withdrawing or injecting liquid from the surface or from a suitable rock formation underground.

Provided both formations are of sufficient size, this pressure differential should not change materially during energy storage or retrieval over the long duration energy storage time period ("long duration" being, in various embodiments, at least 10 hours, at least 20 hours, at least 50 hours, or at least 100 hours). This can be illustrated by considering a simple example of two hydraulically isolated formations subject to a pressure differential of 204 atm, each of dimension 1 km×1 km×100 m and a porosity (percentage of rock volume occupied by liquid) of 0.2, resulting in a total rock volume of $1.0\times10^8$ $m^3$ ($6.29\times10^8$ barrels (bbls)) and a liquid volume of $2.0\times10^7$ $m^3$ ($1.26\times10^8$ bbls).

Assuming typical rock and liquid compressibility, the reduction in pressure differential between the two formations can be calculated for any volume of liquid transferred during energy storage or energy retrieval. For a total transfer of 10,000 $m^3$ (approximately 63,000 bbls) of liquid, the pressure differential remains at approximately 200 atm (2937 psi), only approximately 4 atm (63 psi) less than the initial pressure differential of 204 atm. Assuming a hypothetical round cycle efficiency (pumping and discharging the liquid) of 70% (incorporating hydraulic, mechanical and electrical inefficiencies), fluid transfer from the higher-pressured formation to the lower-pressured formation through a fluid channel incorporating a turbine could theoretically retrieve approximately 40 MWh of electrical energy.

While storage formations will vary significantly in both size and rock properties, this example illustrates that the invention's capacity to store energy will not reduce materially over the long duration energy storage time period, provided each rock formation is of sufficient size. By later pumping liquid that has flowed into the lower-pressured formation back into the higher-pressured formation, the initial pressure differential between the formations will be restored, along with the system's energy storage capacity.

Prior to installation of a subterranean energy storage system, the target formations are assessed for their pressure, size, water permeability, porosity, compressibility, fracture pressure, and other relevant properties to ensure they can store an acceptable amount of energy at an acceptable rate. These properties can be determined using existing technology and methods employed in the hydrology, mining, and oil and gas industries. If depleted aquifers or hydrocarbon fields are utilized as energy storage formations, rock and liquid properties likely would have been previously characterized. Accordingly, depleted oil and gas fields, as well as known geological basins with abnormal pressure regimes, may make attractive sites for long term subterranean energy storage.

Economically efficient energy storage and retrieval is predicated upon sufficient power delivery from the turbine while fluid flows from the higher-pressured to the lower-pressured formation. Power delivery is a function of fluid flow rate, which is based on the pressure differential between the higher-pressured and lower-pressured formations. However, the fluid's impetus will be reduced by frictional pressure losses while flowing through the rock formations and the fluid channel connecting the formations, reducing the flow rate and power delivery. These frictional losses may be reduced by using larger diameter fluid channels, selecting formations relatively close together to minimize the distance the fluid must travel during charge and discharge cycles, and controlling the flow rate. Lower flow rates tend to have reduced frictional losses, as well as reducing wear on equipment and generation of particulate matter from the rock formations (i.e., erosion) which may clog or damage pumps or turbines. Accordingly, the inventor found it is typically preferable to select a fluid flow rate as low as possible while still achieving the desired power delivery rate.

FIG. 1 schematically illustrates a subterranean energy storage system 10 and method of using the same. A fluid channel 12 extends between a higher-pressured subterranean rock formation 14 substantially hydraulically isolated from a lower-pressured subterranean rock formation 16. In the illustrated example, a higher-pressured formation 14 is located deeper than the lower-pressured formation 16, the formations being substantially hydraulically isolated by a layer of fluid-impermeable rock 18 located at a depth between the formations. The higher-pressured subterranean rock formation 14 has a first pressure, and the lower-pressured subterranean rock formation 16 has a second pressure. In some embodiments, the first pressure is at least 10 atm greater than the second pressure, at least 50 atm greater than the second pressure, at least 100 atm greater than the second pressure, or at least 200 atm greater than the second pressure, when corrected to a common depth. For example, at a normal hydrostatic gradient, a first rock formation having a pressure of 29.46 atm at a depth of 1,000 feet and a second rock formation having a pressure of 58.92 atm at a depth of 2,000 feet have equal pressure when corrected to a common depth. For a second example, in a system with a first rock formation having a pressure of 29.46 atm at a depth of 1,000 feet and a second rock formation having a pressure of 68.92 atm at a depth of 2,000 feet, the second rock formation has greater pressure by 10 atm when corrected to a common depth at a normal hydrostatic gradient between the formations. This second example is illustrated in FIG. 1, where a diagonal solid line represents the pressure of the first formation with increasing depth (the x-axis representing pressure, the y-axis representing depth) and a diagonal dashed line represents the pressure of the second formation with increasing depth, and the horizontal distance between the lines indicating the 10 atm pressure differential between the formations.

A turbine 20 in fluid communication with the fluid channel 12 converts kinetic energy of the flowing fluid, such as fresh water or brine, into electricity as the fluid flows through the fluid channel 12 from the higher-pressured formation 14 to the lower-pressured formation 16. At suitable times, such as, for example, when power is available from intermittent renewable energy sources such as wind power and solar power, fluid is then pumped from the lower-pressured formation 16 back into the higher-pressured formation 14, thus resetting the energy storage system 10 and restoring the pressure differential between the formations 14, 16. In some embodiments, separate turbines and pumps may be used, while in other embodiments, as shown in FIG. 1, the turbine 20 may be a pump as turbine (PAT), an apparatus capable of functioning as a pump-turbine and a motor generator unit, to provide both pumping and energy generation functionalities.

Surface control unit 21 represents the various surface-level hydraulic, electric, electro-hydraulic, or computer components, or combinations thereof used to control the PAT 20 and other subterranean controllable elements, such as various valves and drives, discussed below. Surface-level components for activating and deactivating subterranean controllable elements are generally known in the hydrology, mining and oil and gas industries.

Figure 2A:
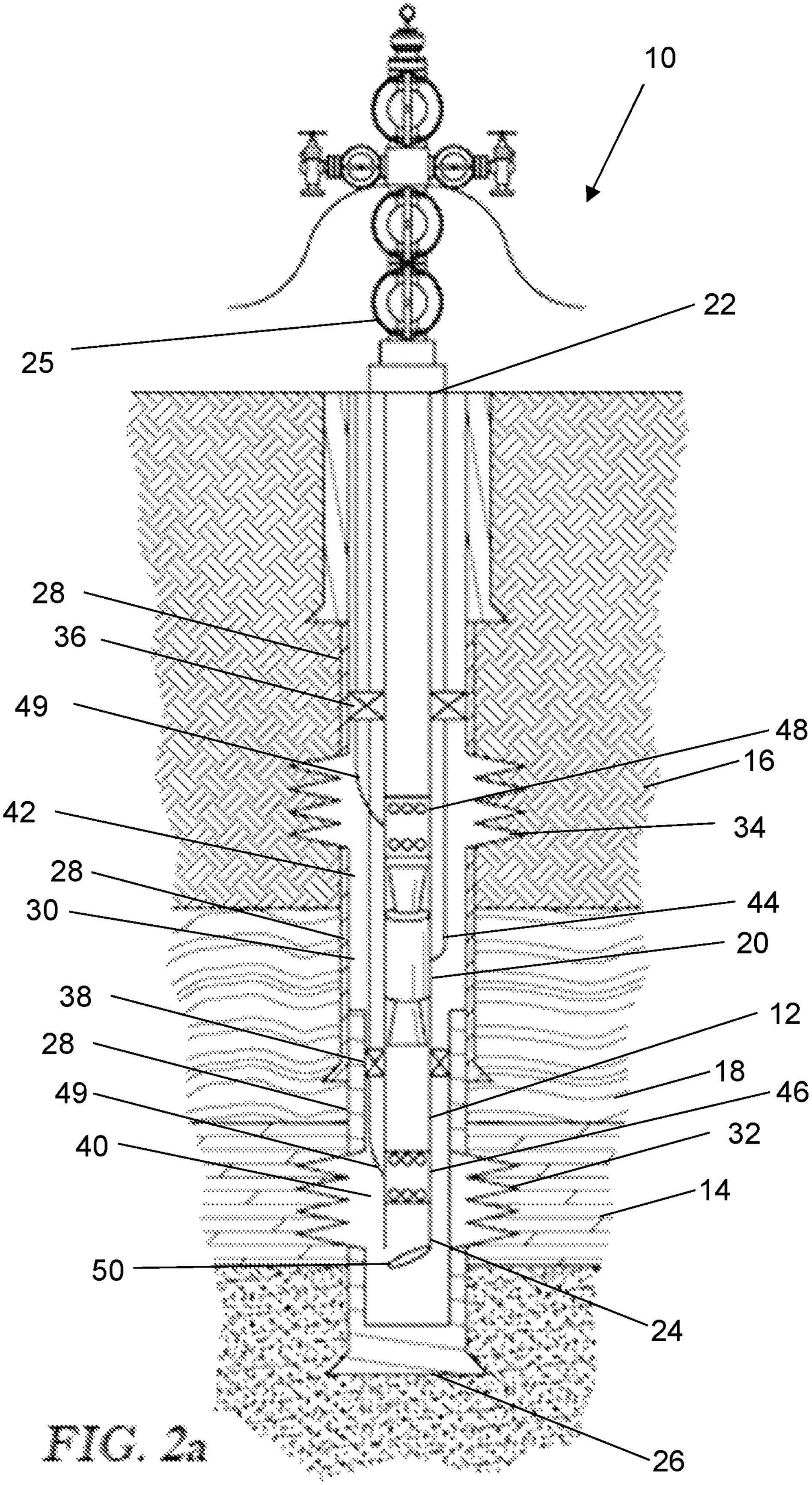
FIG. 2*a* depicts the first embodiment of a subterranean energy storage system including a single pump as turbine, wherein the higher-pressured formation is deeper underground than the lower-pressured formation.

Referring now to FIG. 2*a*, a first embodiment of a subterranean energy storage system 10 includes an elongated fluid channel 12 including a top end 22 and an opposing bottom end 24. In the depicted embodiment, the top end 22 terminates in a wellhead 25. The fluid channel 12 intersects a higher-pressured subterranean formation 14 and a lower-pressured subterranean formation 16. The higher-pressure subterranean formation 14 and the lower-pressured subterranean formation 16 are substantially hydraulically isolated from each other (except via the fluid channel 12) by a layer of fluid-impermeable rock 18 located at a depth between the formations. In some embodiments (not shown), another layer of fluid-impermeable rock is located shallower than the uppermost of the higher-pressured formation 14 and lower-pressured formation 16, reducing the risk of contaminating unconfined aquifers.

In some embodiments, a bore hole 26, such as a wellbore, extends between the higher-pressured subterranean formation 14 and the lower-pressured subterranean formation 16. The diameter of the bore hole 26 may be lined with one or more casings 28, as is typical in the drilling field, such that the casings 28 define an interior 30 of the bore hole 26. The elongated fluid channel 12, which may be a tube, or series of tubes, extends substantially parallel to the bore hole 26 within the interior 30 and radially spaced apart from the casings 28. In other embodiments (not shown), the casings themselves or a casing liner may serve as the fluid channel. While the casings 28 are substantially fluid-impermeable, they include a first opening 32 allowing fluid communication between the interior 30 and the higher-pressured formation 14, and a second opening 34 allowing fluid communication between the interior 30 and the lower-pressured formation 16. The openings 32, 34 (indicated by jagged lines in FIG. 2*a*) may be formed by perforating the casings 28 at depths equal to the formations 14, 16 via explosives or other means known in the art. Other techniques known in the art, such as, for example, hydraulic fracking, matrix acidizing, or fracture acidizing, may be used to create fractures in the rock formations 14, 16 to further increase fluid flow rate into and out of the formations 14, 16. While the bore hole 26, casings 28, and fluid channel 12 shown in FIG. 2*a* and later figures are linear and arranged vertically, it should be understood that bore holes 26 may include single or multiple diagonal or horizontal branches into the higher-pressured formation 14, the lower-pressured formation 16, or both, to further increase the fluid flow rate.

Packers are positioned in the interior 30 of the bore hole 26, radially surrounding the fluid channel 12 and radially extending between the fluid channel 12 and the casings 28, thereby blocking fluid transfer along the bore hole 26, except through the fluid channel 12. A first packer 36 is positioned at a depth shallower than the second opening 34 to isolate unperforated portions of the casings 28 from the fluid and to provide hydraulic isolation of other rock formations. A second packer 38 is positioned within the bore hole 26 at a depth between the first opening 32 and the second opening 34 to divide the interior 30 of the bore hole 26 into a first annular cavity 40 in fluid communication with the higher-pressured formation 14 via the first opening 32 and a second annular cavity 42 in fluid communication with the lower-pressured formation 16 via the second opening 34. The second packer 38 hydraulically isolates the first cavity 40 from the second cavity 42 and the higher-pressured formation 14 from the lower-pressured formation 16. In further embodiments, additional packers may be positioned at different depths for redundancy.

In the depicted first embodiment, a PAT 20 is positioned in-line within the fluid channel 12. While storing energy, the PAT 20 functions as a pump, transferring fluid from the lower-pressured formation 16 to the higher-pressured formation 14. While generating energy, the PAT 20 functions as a turbine as fluid naturally flows from the higher-pressured formation 14 to the lower-pressured formation 16 through the PAT 20 to equalize pressure.

In some embodiments, the PAT 20 is a multi-stage centrifugal pump similar to electrical submersible pumps known in the art. The PAT 20 includes one or more impellers to drive or be driven by the fluid, a motor adapted to act as an electrical generator when the PAT 20 is operating as a turbine, and a shaft connecting the impellers to the motor. In some embodiments, the motor is an AC induction motor or AC permanent magnetic motor. In certain embodiments, a variable speed drive (not shown, may be located at the surface control unit 21 in some embodiments) adjusts the voltage and frequency of the electrical signal supplied to the motor to vary the power of the PAT 20, to better accommodate the varying flow rates which may be required while storing energy (when acting as a pump). In some embodiments, electrical energy is conveyed to the PAT 20 (when acting as a pump) and from the PAT 20 (when acting as a turbine) via one or more electrical cables 44, which extend upward along the bore hole 26 and through the first packer 36 to a suitable surface connection to an electrical grid.

A first controllable access 46 is in fluid communication with the fluid channel 12 and the first cavity 40. A second controllable access 48 is in fluid communication with the fluid channel 12 and the second cavity 42. Each controllable access 46, 48 is independently controllable to transition between an open configuration in which fluid may pass through the controllable access 46, 48, and a closed configuration in which fluid is prevented from passing through the controllable access 46, 48. In some embodiments, the first controllable access 46 and second controllable access 48 are sliding sleeve doors, valves, such as inflow control valves, or a combination thereof. In certain embodiments, the first controllable access 46 is an inflow control valve and the second controllable access 48 is a sliding sleeve door. As shown in FIG. 2*a*, the first controllable access 46 is radially attached to the fluid channel 12 at a depth below the second packer 38 and below the PAT 20, while the second controllable access 48 is radially attached to the fluid channel 12 at a depth above the second packer 38 and above the PAT 20. In some embodiments, the first controllable access 46 and second controllable access 48 are controlled from the surface using hydraulic, electric, or electro-hydraulic signals to actuate the valves, the signals being transmitted via one or more control cables 49 which may extend through packers 36, 38, as necessary, to the surface control unit 21 (shown in FIG. 1, not in FIG. 2*a*). The energy storage system 10 further includes a one-directional valve 50, such as a check valve or flapper valve, positioned in the fluid channel 12 at a depth below the first controllable access 46 and configured to allow fluid flow only in a direction away from the PAT 20. In the depicted first embodiment, the one-directional valve 50 is a flapper valve mounted on the bottom end 24 of the fluid channel 12.

In use, the first embodiment energy storage system 10 is charged by pumping fluid from the lower-pressured subterranean rock formation 14 to the higher-pressured subterranean rock formation 16 with the first controllable access 46 in the closed configuration and the second controllable access 48 in the open configuration. The PAT 20 is activated as a pump, drawing fluid from the lower-pressured formation 16, through the second opening 34, into the second cavity 42, through the open second controllable access 48 into the fluid channel 12, and downward along the fluid channel 12. Once the pump discharge pressure exceeds the static pressure in the higher-pressured formation 14, the one-directional valve 50 will open and permit fluid flow into the first cavity 40, through the first opening 32, and into the higher-pressured formation 14.

After charging, the energy storage system 10 provides long duration storage of energy by blocking fluid flow between the formations 14, 16 with the first controllable access 46 and the second controllable access 48 in the closed configuration and the PAT 20 inactivated.

The first embodiment energy storage system 10 is discharged by enabling fluid flow from the higher-pressured subterranean rock formation 14 to the lowered pressured subterranean rock formation 16 with the first controllable access 46 and the second controllable access 48 both in the open configuration. The PAT 20 is activated as a turbine. Due to the pressure differential between formations 14, 16, fluid flows from the higher-pressured formation 14, through the first opening 32, into the first cavity 40, through the open first controllable access 46 into the fluid channel 12, upward through the PAT 20, thereby generating electricity, through the open second controllable access 48 into the second cavity 42, and through the second opening 34 into the lower-pressured formation 16.

Figure 2B:
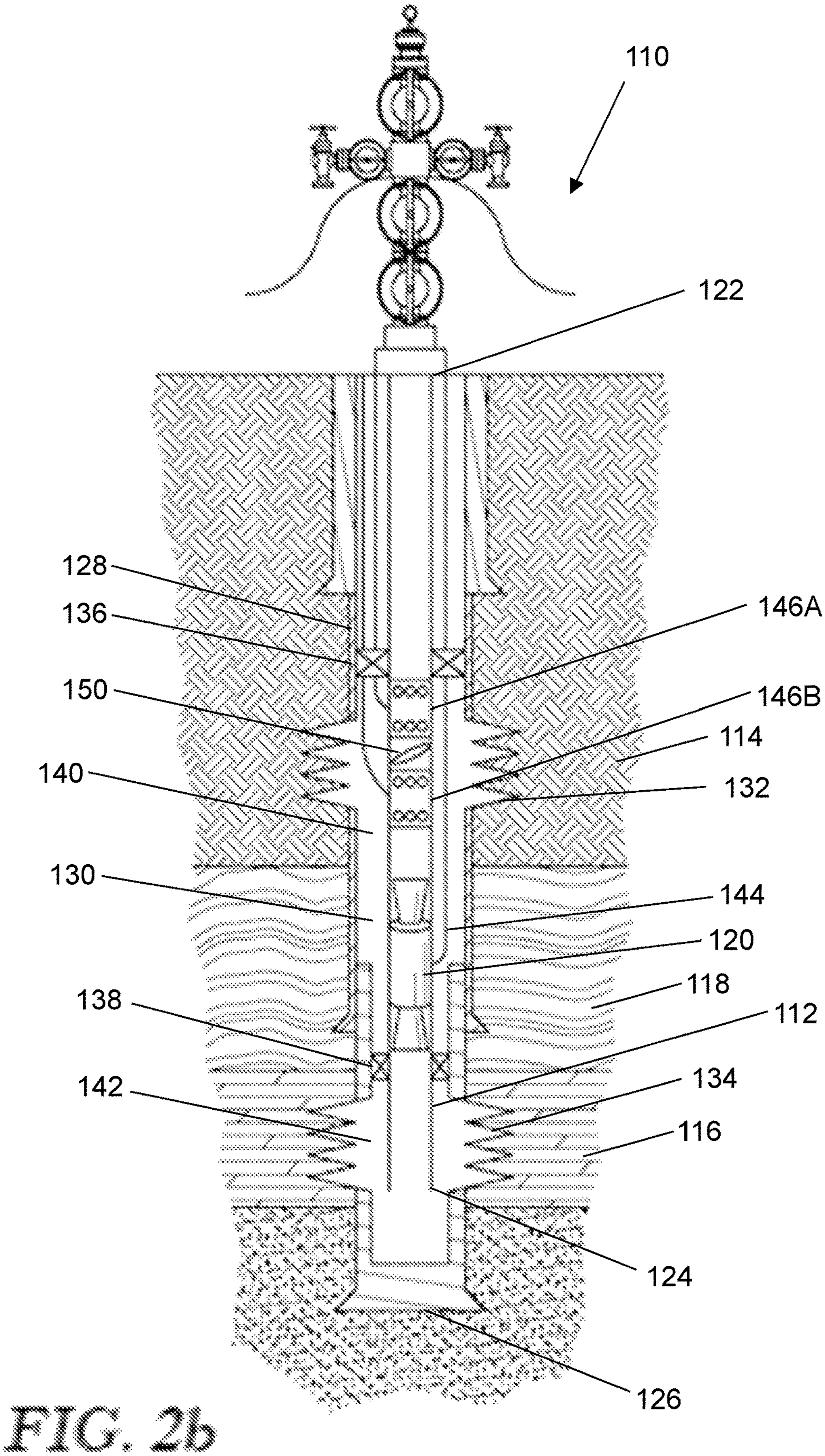
FIG. 2*b* depicts a second embodiment of a subterranean energy storage system including a single pump as turbine, wherein the lower-pressured formation is deeper than the higher-pressured formation.

Referring now to FIG. 2*b*, a second embodiment of a subterranean energy storage system 110 includes an elongated fluid channel 112 including a top end 122 and an opposing bottom end 124. The fluid channel 112 intersects a higher-pressured subterranean formation 114 and a lower-pressured subterranean formation 116 substantially hydraulically isolated from each other (except via the fluid channel 112) by a layer of fluid-impermeable rock 118 located at a depth between the formations. Unlike in the previous embodiment, in this second embodiment 110 the higher-pressured formation 114 is shallower than the lower-pressured formation 116.

A bore hole 126 extends between the higher-pressured subterranean formation 114 and the lower-pressured subterranean formation 116. The diameter of the bore hole 126 may be lined with one or more casings 128, as is typical in the drilling field, such that the casings 128 define an interior 130 of the bore hole 126. The elongated fluid channel 112 extends substantially parallel to the bore hole 126 within the interior 130 and radially spaced apart from the casings 128. The casings 128 include a first opening 132 allowing fluid communication between the interior 130 and the higher-pressured formation 114, and a second opening 134 allowing fluid communication between the interior 130 and the lower-pressured formation 116.

A first packer 136 is positioned at a depth shallower than the first opening 132 to isolate unperforated portions of the casings 128 from the fluid and to provide hydraulic isolation of other rock formations. A second packer 138 is positioned within the bore hole 126 at a depth between the first opening 132 and the second opening 134 to divide the interior 130 of the bore hole 126 into a first annular cavity 140 in fluid communication with the higher-pressured formation 114 via the first opening 132 and a second annular cavity 142 in fluid communication with the lower-pressured formation 116 via the second opening 134. The second packer 138 hydraulically isolates the first cavity 140 from the second cavity 142 and the higher-pressured formation 114 from the lower-pressured formation 116.

In the depicted second embodiment, a PAT 120 is positioned in-line within the fluid channel 112. While storing energy, the PAT 120 functions as a pump, transferring fluid from the lower-pressured formation 116 to the higher-pressured formation 114. While generating energy, the PAT 120 functions as a turbine as fluid naturally flows from the higher-pressured formation 114 to the lower-pressured formation 116 through the PAT 120 to equalize pressure. Electrical energy is conveyed to the PAT 120 (when acting as a pump) and from the PAT 120 (when acting as a turbine) via one or more electrical cables 144, which extend upward along the bore hole 126 and through the first packer 136 to a suitable surface connection to an electrical grid.

As shown in FIG. 2*b*, a one-directional valve 150 is positioned within the fluid channel 112 above the PAT 120 and configured to allow fluid flow through the one-directional valve 150 only away from the PAT 120. An upper first controllable access 146A is in fluid communication with the fluid channel 112 and the first cavity 140, radially attached to the fluid channel 112, and positioned above the one-directional valve 150. A lower first controllable access 146B is in fluid communication with the fluid channel 112 and the first cavity 140, is radially attached to the fluid channel 112, and is positioned below the one-directional valve 150.

In use, the second embodiment energy storage system 110 is charged with the lower first controllable access 146B in the closed configuration and the upper first controllable access 146A in the open configuration. While fluid may pass into the fluid channel 112 via the open upper first controllable access 146A, the one-directional valve 150 prevents the fluid from passing downward through the fluid channel 112 to the lower-pressured formation 116. The PAT 120 is activated as a pump, drawing fluid from the lower-pressured formation 116, through the second opening 134, into the second cavity 142, into the open bottom end 124 of the fluid channel 112, and upwards through the fluid channel 112. Once the pump discharge pressure exceeds the static pressure in the higher-pressured formation 114, the one-directional valve 150 will open and permit fluid to continue to flow upwards through the fluid channel 112, through the open upper first controllable access 146A into the first cavity 140, through the first opening 132, and into the higher-pressured formation 114.

After charging, the energy storage system 110 provides long duration storage of energy by blocking fluid flow between the formations 114, 116 with the upper and lower controllable accesses 146A, 146B in the closed configuration and the PAT 120 inactivated.

The second embodiment energy storage system 110 is discharged with the lower first controllable access 146B in the open configuration and the upper first controllable access 146A in the closed configuration. The PAT 120 is activated as a turbine. Due to the pressure differential between formations 114, 116, fluid flows from the higher-pressured formation 114, through the first opening 132, into the first cavity 140, through the open lower first controllable access 146B into the fluid channel 112, downward through the PAT 120, thereby generating electricity, out from the open bottom end 124, into the second cavity 142, and through the second opening 134 into the lower-pressured formation 116.

Figure 3A:
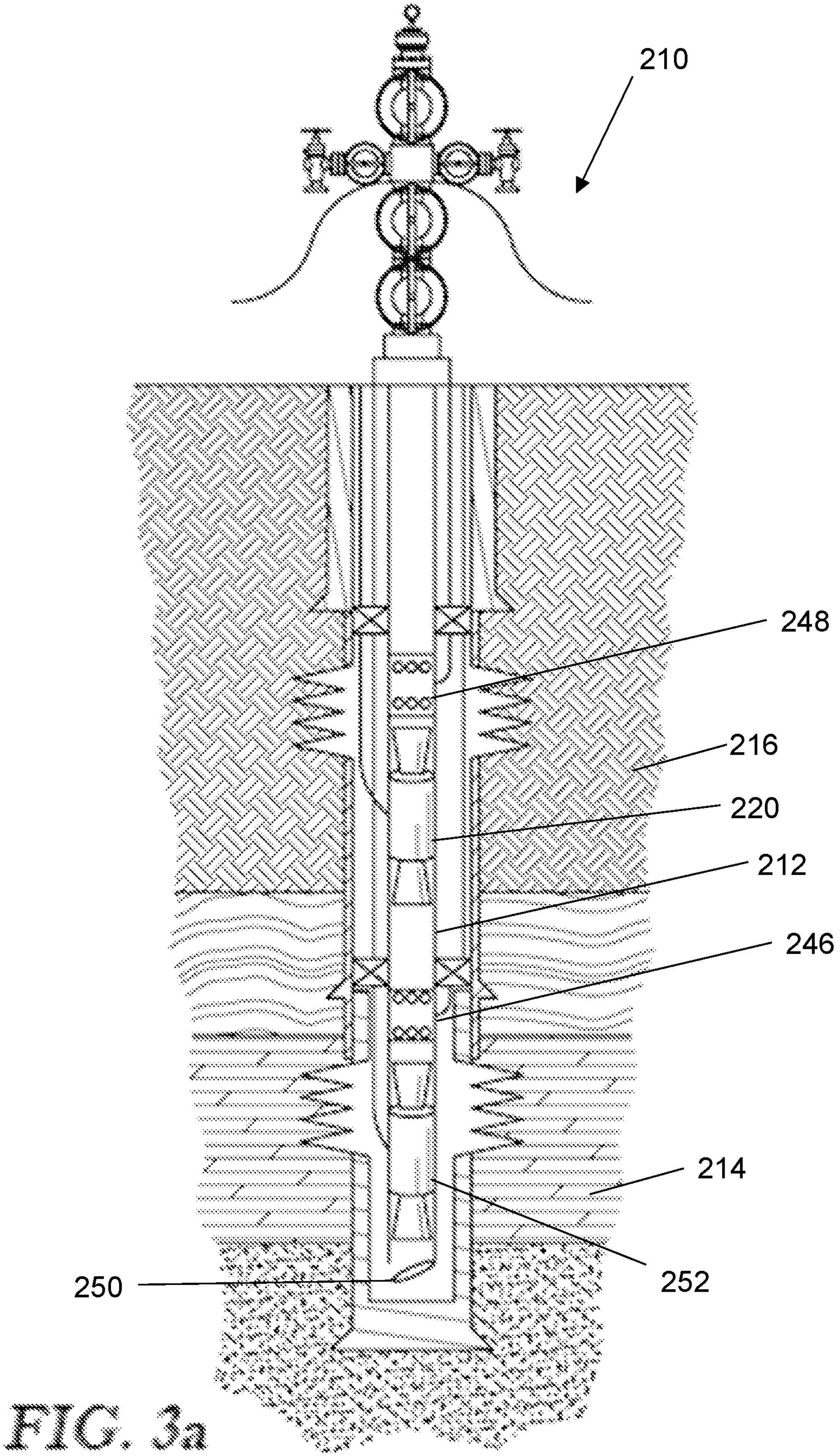
FIG. 3*a* depicts a third embodiment of a subterranean energy storage system including a pump as turbine and an additional pump, wherein the higher-pressured formation is deeper than the lower-pressured formation.

Referring now to FIG. 3*a*, a third embodiment of a subterranean energy storage system 210 includes the same elements as the first embodiment energy storage system 10, and is similarly designed for use with a higher-pressured rock formation 214 located deeper than a lower-pressured rock formation 216, but further includes a pump 252 positioned in-line within the fluid channel 212 between the one-directional valve 250 and the first controllable access 246.

In use, the third embodiment energy storage system 210 is charged, stores energy, and is discharged similar to the first embodiment energy storage system 10, except that the PAT 220 and pump 252 may be activated simultaneously (PAT 220 functioning as a pump) to achieve greater fluid flow rates to increase the rate of energy storage, or PAT 220 may be activated individually as a turbine upon opening both first and second controllable accesses 246, 248. During discharge, fluid flows into the fluid channel 212 via the first controllable access 246 and through the PAT 220, bypassing the pump 252 to avoid a potential reduction of fluid flow.

Figure 3B:
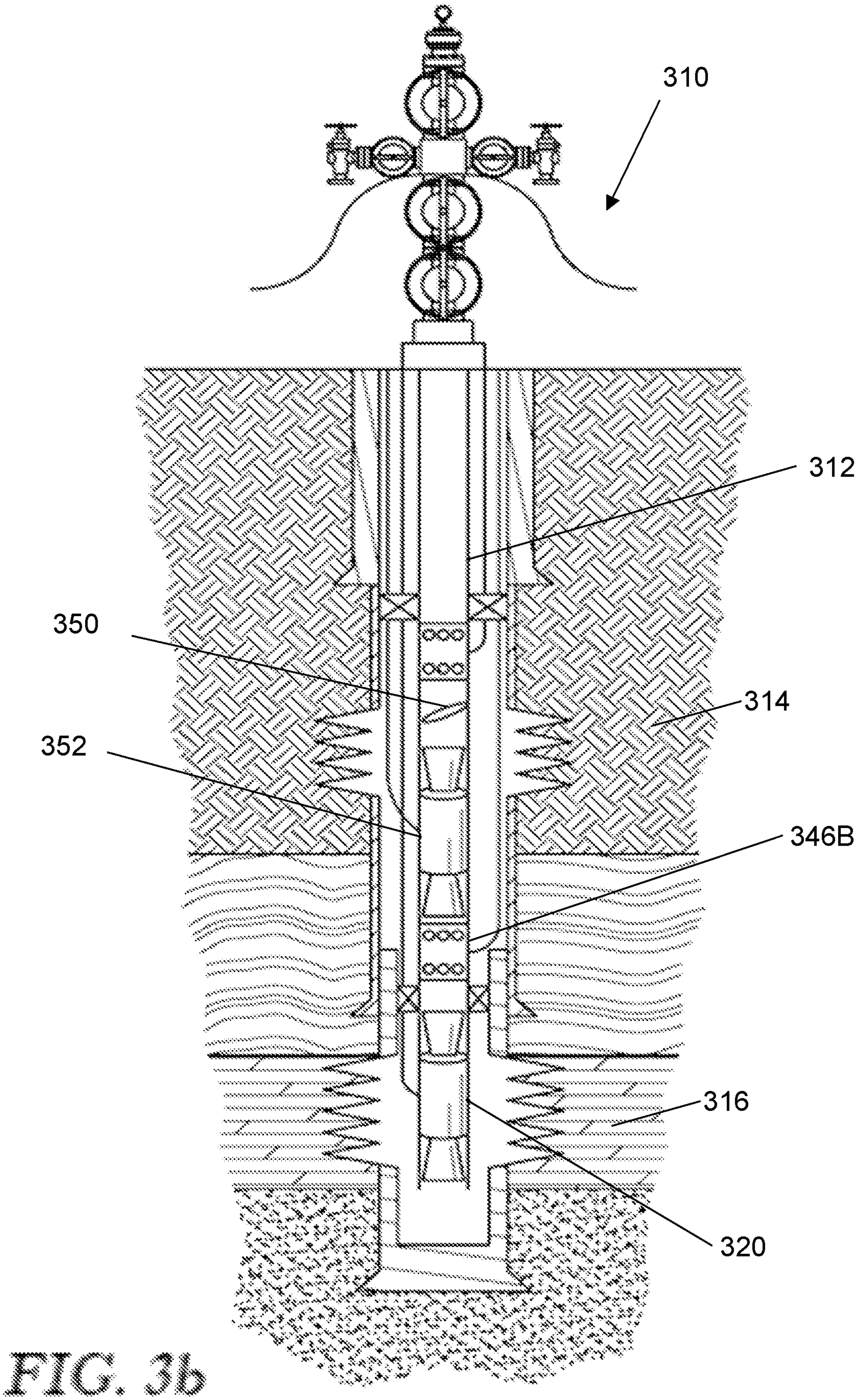
FIG. 3*b* depicts a fourth embodiment of a subterranean energy storage system including a pump as turbine and an additional pump, wherein the lower-pressured formation is deeper than the higher-pressured formation.

Referring now to FIG. 3*b*, a fourth embodiment of a subterranean energy storage system 310 includes the same elements as the second embodiment energy storage system 110, and is similarly designed for a higher-pressured rock formation 314 located shallower than a lower-pressured rock formation 316, but further includes a pump 352 positioned in-line within the fluid channel 312 between the one-directional valve 350 and the lower first controllable access 346B.

In use, the fourth embodiment energy storage system 310 is charged, stores energy, and is discharged similar to the second embodiment energy storage system 110, except that the PAT 320 and pump 352 may be activated simultaneously (PAT 320 functioning as a pump) to achieve greater fluid flow rates to increase the rate of energy storage. PAT 320 may also be activated individually as a turbine. During discharge, fluid flows into the fluid channel 312 via the lower first controllable access 346B and through the PAT 320, bypassing the pump 352 to avoid a potential reduction of fluid flow.

Figure 4A:
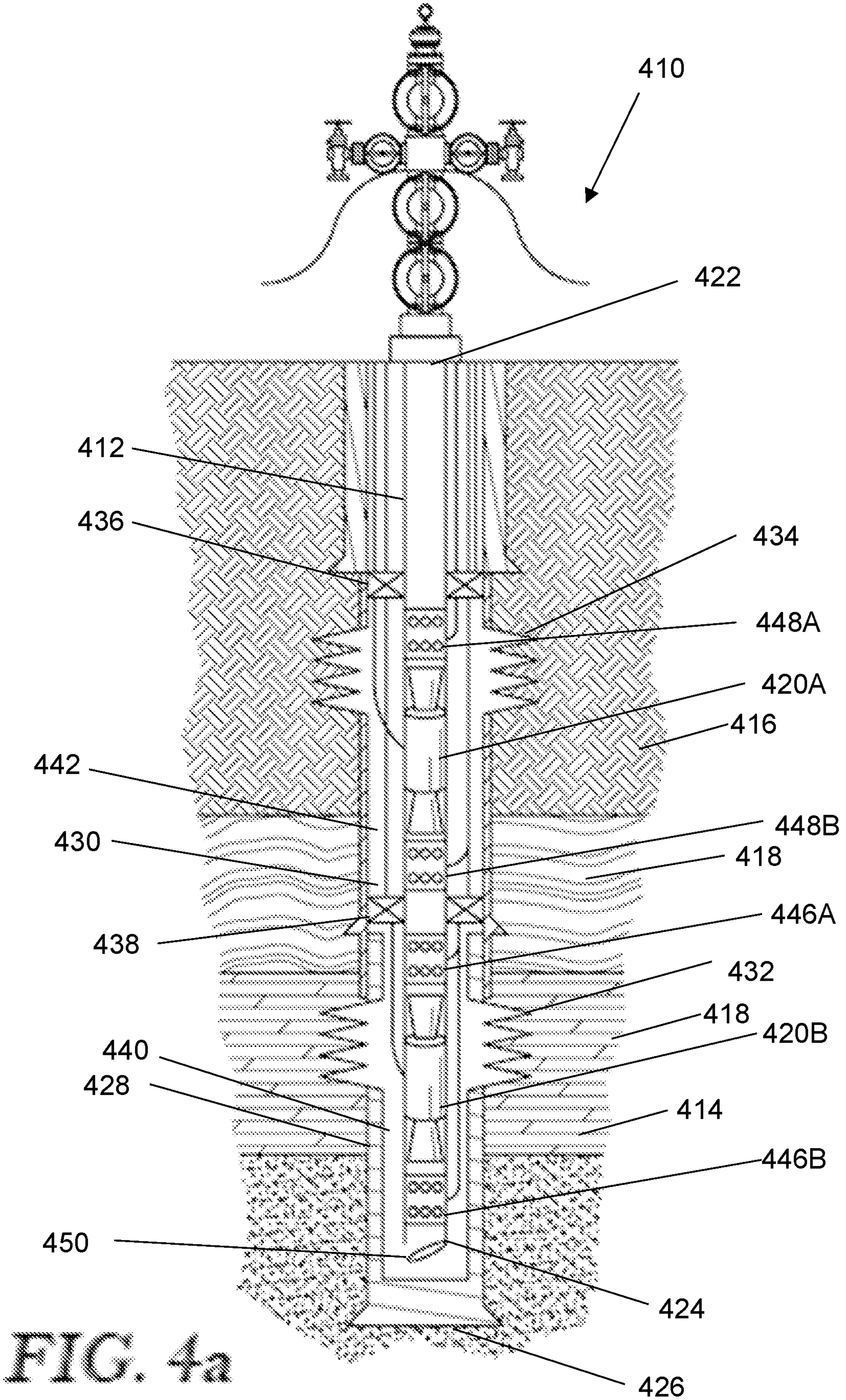
FIG. 4*a* depicts a fifth embodiment of a subterranean energy storage system including two pump as turbines, wherein the higher-pressured formation is deeper than the lower-pressured formation.

In some embodiments, it may be advantageous to include additional independently operated PATs arranged in series or parallel for greater control to fluid flow rates or to provide redundancy. Referring now to FIG. 4*a*, a fifth embodiment of a subterranean energy storage system 410 includes an elongated fluid channel 412 including a top end 422 and an opposing bottom end 424. The fluid channel 412 intersects a higher-pressured subterranean formation 414 deeper than a lower-pressured subterranean formation 416, the formations 414, 416 being substantially hydraulically isolated from each other (except via the fluid channel 412) by a layer of fluid-impermeable rock 418 located at a depth between the formations 414, 416.

A cylindrical bore hole 426 extends between the higher-pressured subterranean formation 414 and the lower-pressured subterranean formation 416. The diameter of the bore hole 426 may be lined with one or more casings 428, such that the casings 428 define an interior 430 of the bore hole 426. The elongated fluid channel 412 extends substantially parallel to the bore hole 426 within the interior 430 and radially spaced apart from the casings 428. The casings 428 include a first opening 432 allowing fluid communication between the interior 430 and the higher-pressured formation 414, and a second opening 434 allowing fluid communication between the interior 430 and the lower-pressured formation 416.

Packers are positioned in the interior 430 of the bore hole 426, radially surrounding the fluid channel 412 and radially extending between the fluid channel 412 and the casings 428, thereby blocking fluid transfer along the bore hole 426, except through the fluid channel 412. A first packer 436 is positioned at a depth shallower than the second opening 434 to isolate unperforated portions of the casings 428 from the fluid and to provide hydraulic isolation of other rock formations. A second packer 438 is positioned within the bore hole 426 at a depth between the first opening 432 and the second opening 434 to divide the interior 430 of the bore hole 426 into a first annular cavity 440 in fluid communication with the higher-pressured formation 414 via the first opening 432 and a second annular cavity 442 in fluid communication with the lower-pressured formation 416 via the second opening 434. The second packer 438 hydraulically isolates the first cavity 440 from the second cavity 442 and the higher-pressured formation 414 from the lower-pressured formation 416.

In the depicted fifth embodiment, an upper PAT 420A and a lower PAT 420B are positioned in-line sequentially within the fluid channel 412, the lower PAT 420B being positioned deeper than the upper PAT 420A. An upper first controllable access 446A is in fluid communication with the fluid channel 412 and the first cavity 440, and positioned shallower than the lower PAT 420B. A lower first controllable access 446B is in fluid communication with the fluid channel 412 and the first cavity 440, and positioned deeper than the lower PAT 420B. An upper second controllable access 448A is in fluid communication with the fluid channel 412 and the second cavity 442, and positioned shallower than the upper PAT 420A. A lower second controllable access 448B is in fluid communication with the fluid channel 412 and the second cavity 442, and positioned deeper than the upper PAT 420A. Each controllable access 446A, 446B, 448A, 448B is independently controllable to transition between an open configuration and a closed configuration. As shown in FIG. 4*a*, the upper and lower first controllable accesses 446A, 446B are radially attached to the fluid channel 412 at a depth below the second packer 438, while the upper and lower second controllable accesses 448A, 448B are radially attached to the fluid channel 412 at a depth above the second packer 438.

The energy storage system 410 further includes a one-directional valve 450 positioned on the fluid channel 412 at a depth below the lower first controllable access 446B and configured to allow fluid flow only in a direction away from the lower PAT 420B. In the depicted fifth embodiment, the one-directional valve 450 is a flapper valve mounted on the bottom end 424 of the fluid channel 412.

In use, the fifth embodiment energy storage system 410 may be charged by activating a single PAT or by activating both PATs in tandem. Operating each PAT independently provides redundancy, while operating in tandem provides a higher flow rate for faster charging. To charge the fifth embodiment subterranean energy storage system 410 by activating a single PAT, the lower PAT 420B operates as a pump, the upper PAT 420A is inactivated, the lower second controllable access 448B is in the open configuration, and the upper second controllable access 448A, the upper first controllable access 446A, and the lower first controllable access 446B are in the closed configuration. The activated lower PAT 420B draws fluid from the lower-pressured formation 416, through the second opening 434, into the second cavity 442, through the open upper second controllable access 448B into the fluid channel 412, and downward along the fluid channel 412. This fluid flow path bypasses the inactivated upper PAT 420A.

To charge the fifth embodiment energy storage system 410 in tandem, the upper PAT 420A and lower PAT 420B each operate as a pump, the upper second controllable access 448A is in the open configuration, and the lower second controllable access 448B, the upper first controllable access 446A, and the lower first controllable access 446B are in the closed configuration. The activated upper and lower PATs 420A, 420B draw fluid from the lower-pressured formation 416, through the second opening 434, into the second cavity 442, through the open upper second controllable access 448A into the fluid channel 412, and downward along the fluid channel 412. Regardless of whether the energy storage system 410 is charged using one or two PATs, once the pump discharge pressure exceeds the static pressure in the higher-pressured formation 414, the one-directional valve 450 will open and permit fluid flow into the first cavity 440, through the first opening 432, and into the higher-pressured formation 414.

After charging, the energy storage system 410 provides long duration storage of energy by blocking fluid flow between the formations 414, 416 with the upper and lower first controllable accesses 446A, 446B and the upper and lower second controllable accesses 448A, 448B in the closed configuration and the upper and lower PATs 420A, 420B inactivated.

The fifth embodiment energy storage system 410 may be discharged by activating the upper PAT 420A or the lower PAT 420B independently to provide redundancy, or by activating both PATs 420A, 420B. In a first discharge mode for the system 410, the upper PAT 420A is activated as turbine, the lower PAT 420B is inactivated, the upper first controllable access 446A and the upper second controllable access 448A are in the open configuration, and the lower first controllable access 446B and the lower second controllable access 448B are in the closed configuration. Due to the pressure differential between formations 414, 416, fluid flows from the higher-pressured formation 414, through the first opening 432, into the first cavity 440, through the open upper first controllable access 446A, into the fluid channel 412, upward through the upper PAT 420A, thereby generating electricity, through the open upper second controllable access 448A, into the second cavity 442, and through the second opening 434 into the lower-pressured formation 416. This fluid flow path bypasses the inactivated lower PAT 420B.

In a second discharge mode for the system 410, the lower PAT 420B is activated as a turbine, the upper PAT 420A is inactivated, the lower first controllable access 446B and the lower second controllable access 448B are in the open configuration, and the upper first controllable access 446A and the upper second controllable access 448A are in the closed configuration. Due to the pressure differential between formations 414, 416, fluid flows from the higher-pressured formation 414, through the first opening 432, into the first cavity 440, through the open lower first controllable access 446B, into the fluid channel 412, upward through the lower PAT 420B, thereby generating electricity, through the open lower second controllable access 448B, into the second cavity 442, and through the second opening 434 into the lower-pressured formation 416. This fluid flow path bypasses the inactivated upper PAT 420A.

In a third discharge mode for the system 410, the upper PAT 420A and lower PAT 420B are both activated as turbines, the lower first controllable access 446B and the upper second controllable access 448A are in the open configuration, and the upper first controllable access 446A and the lower second controllable access 448B are in the closed configuration. Due to the pressure differential between formations 414, 416, fluid flows from the higher-pressured formation 414, through the first opening 432, into the first cavity 440, through the open lower first controllable access 446B, into the fluid channel 412, upward sequentially through the lower PAT 420B and the upper PAT 420A, thereby generating electricity, through the open upper second controllable access 448A, into the second cavity 442, and through the second opening 434 into the lower-pressured formation 416.

Figure 4B:
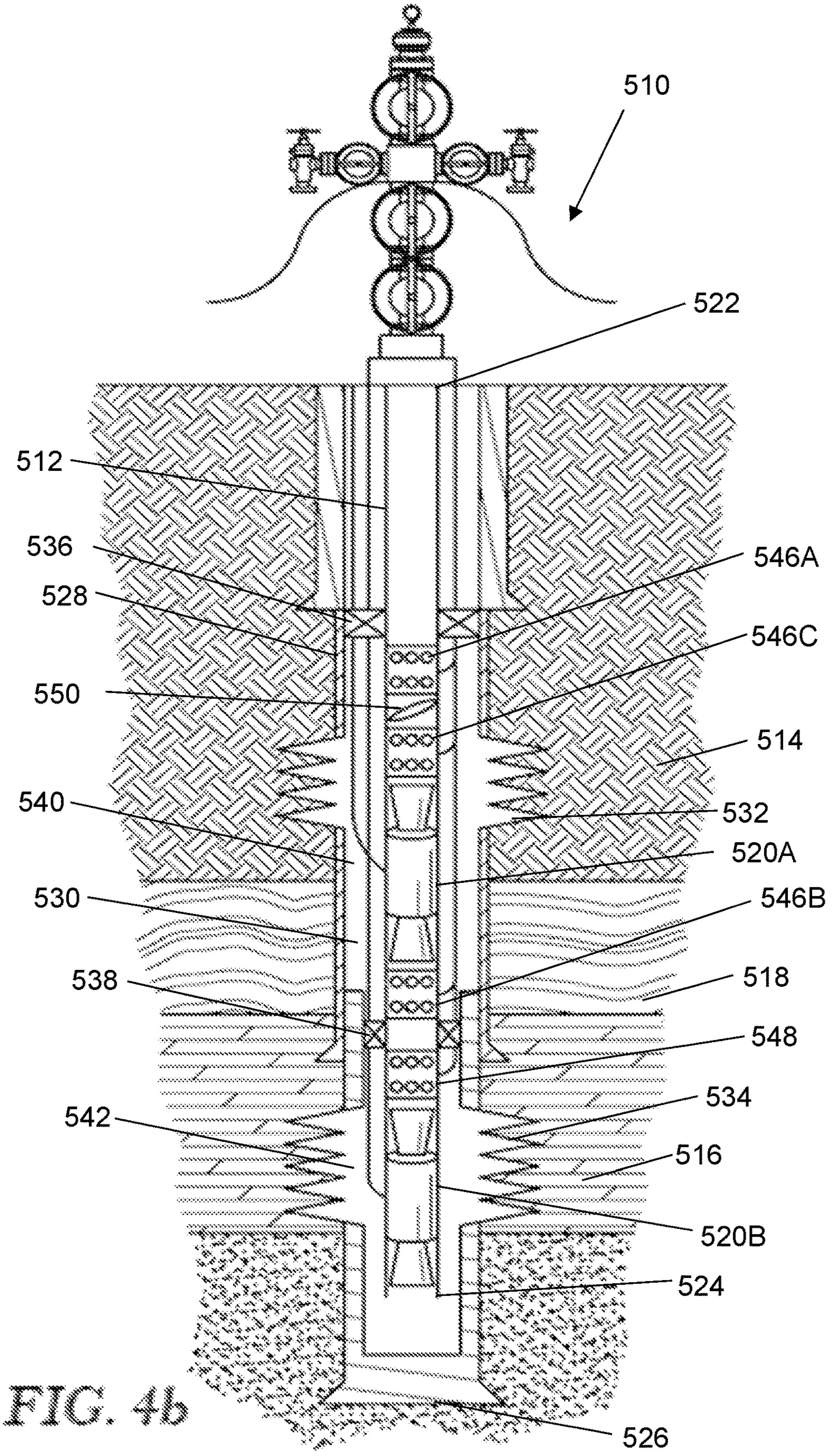
FIG. 4*b* depicts a sixth embodiment of a subterranean energy storage system including two pump as turbines, wherein the lower-pressured formation is deeper than the higher-pressured formation.

Referring now to FIG. 4*b*, a sixth embodiment of a subterranean energy storage system 510 includes an elongated fluid channel 512 including a top end 522 and an opposing bottom end 524. The fluid channel 512 intersects a higher-pressured subterranean formation 514 shallower than a lower-pressured subterranean formation 516, the formations 514, 516 being substantially hydraulically isolated from each other (except via the fluid channel 512) by a layer of fluid-impermeable rock 518 located at a depth between the formations 514, 516.

A cylindrical bore hole 526 extends between the higher-pressured subterranean formation 514 and the lower-pressured subterranean formation 516. The diameter of the bore hole 526 may be lined with one or more casings 528, such that the casings 528 define an interior 530 of the bore hole 526. The elongated fluid channel 512 extends substantially parallel to the bore hole 526 within the interior 530 and radially spaced apart from the casings 528. The casings 528 include a first opening 532 allowing fluid communication between the interior 530 and the higher-pressured formation 514, and a second opening 534 allowing fluid communication between the interior 530 and the lower-pressured formation 516.

A first packer 536 is positioned at a depth shallower than the first opening 532 to isolate unperforated portions of the casings 528 from the fluid and to provide hydraulic isolation of other rock formations. A second packer 538 is positioned within the bore hole 526 at a depth between the first opening 532 and the second opening 534 to divide the interior 530 of the bore hole 526 into a first annular cavity 540 in fluid communication with the higher-pressured formation 514 via the first opening 532 and a second annular cavity 542 in fluid communication with the lower-pressured formation 516 via the second opening 534. The second packer 538 hydraulically isolates the first cavity 540 from the second cavity 542 and the higher-pressured formation 514 from the lower-pressured formation 516.

In the depicted sixth embodiment, an upper PAT 520A and a lower PAT 520B are positioned in-line sequentially within the fluid channel 512, the lower PAT 520B being positioned deeper than the upper PAT 520A. A one-directional valve 550 is positioned within the fluid channel 512 above the upper PAT 520A and configured to allow fluid flow through the one-directional valve only away from the upper PAT 520A.

An upper first controllable access 546A is in fluid communication with the fluid channel 512 and the first cavity 540, and positioned above the one-directional valve 550. A lower first controllable access 546B is in fluid communication with the fluid channel 512 and the first cavity 540, and positioned between the upper PAT 520A and the second packer 538. A middle first controllable access 546C is in fluid communication with the fluid channel 512 and the first cavity 540, and positioned between the one-directional valve 550 and the upper PAT 520A. A second controllable access 548 is in fluid communication with the fluid channel 512 and the second cavity 542, and positioned between the lower first controllable access 546B and the lower PAT 520B. The controllable accesses 546A, 546B, 546C, 548 are independently controllable to transition between closed and open configurations as described above. As shown in FIG. 4*b*, the upper, middle, and lower first controllable accesses 546A, 546C, 546B are radially attached to the fluid channel 512 at a depth above the second packer 538, while second controllable access 548 is radially attached to the fluid channel 512 at a depth below the second packer 538.

In use, the sixth embodiment energy storage system 510 may be charged by activating a single PAT or by activating both PATs in tandem. Operating each PAT independently provides redundancy, while operating in tandem provides a higher flow rate for faster charging. To charge the sixth embodiment subterranean energy storage system 510 by activating a single PAT, the upper PAT 520A operates as a pump, the lower PAT 520B is inactivated, the upper first controllable access 546A and second controllable access 548 are in the open configuration, and the middle and lower first controllable accesses 546C, 546B are in the closed configuration. The activated upper PAT 520A draws fluid from the lower-pressured formation 516, through the second opening 534, into the second cavity 542, through the open second controllable access 548 into the fluid channel 512. This fluid flow path bypasses the inactivated lower PAT 520B.

To charge the sixth embodiment energy storage system 510 in tandem, the upper and lower PATs 520A, 520B each operate as a pump, the upper first controllable access 546A is in the open configuration, and the second controllable access 548 and the middle and lower first controllable accesses 546C, 546B are in the closed configuration. The activated upper and lower PATs 520A, 520B draw fluid from the lower-pressured formation 516, through the second opening 534, into the second cavity 542, through the open bottom end 524 and upward along the fluid channel 512. Regardless of whether the energy storage system 510 is charged using one or two PATs, once the pump discharge pressure exceeds the static pressure in the higher-pressured formation 514, the one-directional valve 550 will open and permit fluid to continue to flow upwards through the fluid channel 512, through the open upper first access 546A into the first cavity 540, through the first opening 532, and into the higher-pressured formation 514.

After charging, the subterranean energy storage system 510 provides long duration storage of energy by blocking fluid flow between the formations 514, 516 with the upper, middle, and lower first controllable accesses 546A, 546C, 546B and the second controllable access 548 in the closed configuration and the upper and lower PATs 520A, 520B inactivated.

The sixth embodiment subterranean energy storage system 510 may be discharged by activating the upper PAT 520A or the lower PAT 520B independently to provide redundancy, or by activating both PATs 520A, 520B. In a first discharge mode for the system 510, the upper PAT 520A is activated as turbine, the lower PAT 520B is inactivated, the middle first controllable access 546C and second controllable access 548 are in the open configuration, and the upper and lower first controllable accesses 546A, 546B are in the closed configuration. Due to the pressure differential between formations 514, 516, fluid flows from the higher-pressured formation 514, through the first opening 532, into the first cavity 540, through the open middle first controllable access 546C, into the fluid channel 512, downward through the upper PAT 520A, thereby generating electricity, through the open second controllable access 548, into the second cavity 542, and through the second opening 534 into the lower-pressured formation 516. This fluid flow path bypasses the inactivated lower PAT 520B.

In a second discharge mode for the system 510, the lower PAT 520B is activated as a turbine, the upper PAT 520A is inactivated, the lower first controllable access 546B is in the open configuration, and the upper and middle first controllable accesses 546A, 546C and the second controllable access 548 are in the closed configuration. Due to the pressure differential between formations 514, 516, fluid flows from the higher-pressured formation 514, through the first opening 532, into the first cavity 540, through the open lower first controllable access 546B, into the fluid channel 512, downward through the lower PAT 520B, thereby generating electricity, through the open lower end 524, into the second cavity 542, and through the second opening 534 into the lower-pressured formation 516. This fluid flow path bypasses the inactivated upper PAT 520A.

In a third discharge mode for the system 510, the upper PAT 520A and lower PAT 520B are both activated as turbines, the middle first controllable access 546C is in the open configuration, and the upper and lower first controllable accesses 546A, 546B and the second controllable access 548 are in the closed configuration. Due to the pressure differential between formations 514, 516, fluid flows from the higher-pressured formation 514, through the first opening 532, into the first cavity 540, through the open middle first controllable access 546C, into the fluid channel 512, downward sequentially through the upper PAT 520A and the lower PAT 520B, thereby generating electricity, through the open lower end 524, into the second cavity 542, and through the second opening 534 into the lower-pressured formation 516.

Reference systems that may be used herein can refer generally to various directions (e.g., top, bottom, leftward, rightward, upper, lower, deeper, shallower), which are merely offered to assist the reader in understanding the various embodiments of the disclosure and are not to be interpreted as limiting. It should be understood that the disclosed energy storage system may not be aligned precisely vertically, and may extend diagonally or horizontally between subterranean formations of different pressures. Accordingly, the terms "upper" and "shallower" refer to locations closer to the top end of the fluid channel while the terms "lower" and "deeper" refer to locations closer to the bottom end of the fluid channel. Other reference systems may be used to describe various embodiments.

While examples, one or more representative embodiments, and specific forms of the disclosure, have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

The invention claimed is:

1. A subterranean energy storage system, comprising:

a bore hole including an interior, the bore hole extending between a higher-pressured subterranean rock formation and a lower-pressured subterranean rock formation;

a first opening allowing fluid communication between the interior and the higher-pressured subterranean rock formation;

a second opening allowing fluid communication between the interior and the lower-pressured subterranean rock formation;

a fluid channel extending substantially parallel to the bore hole within the interior;

a packer positioned in the interior, the packer radially surrounding the fluid channel and blocking fluid transfer along the bore hole except through the fluid channel, wherein the packer is positioned at a depth between the first opening and the second opening, dividing the interior into a first cavity in fluid communication with the higher-pressured formation and a second cavity in fluid communication with the lower-pressured formation;

a first controllable access configured to transition between an open configuration in which fluid may pass through the first controllable access between the first cavity and the fluid channel and a closed configuration in which fluid is substantially prevented from passing through the first controllable access;

a turbine within the fluid channel;

wherein the higher-pressured subterranean rock formation and the lower-pressured subterranean rock formation are substantially hydraulically isolated from each other except via the fluid channel, and wherein the higher-pressured subterranean rock formation has a higher pressure than the lower-pressured subterranean rock formation when corrected to a common depth.

2. The subterranean energy storage system of claim 1, further comprising a second controllable access configured to transition between an open configuration in which fluid may pass through the second controllable access between the second cavity and the fluid channel and a closed configuration in which fluid is substantially prevented from passing through the second controllable access.

3. The subterranean energy storage system of claim 1, wherein the turbine is a pump as turbine (PAT).

4. The subterranean energy storage system of claim 1, wherein the packer is a second packer and wherein the subterranean energy storage system further comprises a first packer, the first packer positioned in the interior, the first packer radially surrounding the fluid channel and blocking fluid transfer along the bore hole except through the fluid channel, wherein the first packer is positioned at a depth shallower than the first opening, shallower than the second opening, and shallower than the second packer.

5. The subterranean energy storage system of claim 1, wherein the fluid channel includes a top end attached to a wellhead and a bottom end opposite the top end.

6. The subterranean energy storage system of claim 5, further comprising a one-directional valve attached to the fluid channel deeper than the first controllable access, the one-directional valve configured to allow fluid to flow deeper but not shallower within the fluid channel.

7. The subterranean energy storage system of claim 6, further comprising a second controllable access configured to transition between an open configuration in which fluid may pass through the second controllable access between the second cavity and the fluid channel and a closed configuration in which fluid is substantially prevented from passing through the second controllable access;

wherein the first controllable access is located within the fluid channel shallower than the one-directional valve;

wherein the turbine is located within the fluid channel shallower than the first controllable access; and wherein the second controllable access is located within the fluid channel shallower than the turbine.

8. The subterranean energy storage system of claim 7, further comprising a pump located within the fluid channel between the one-directional valve and the first controllable access, the pump configured to pump fluid in the direction of the one-directional valve.

9. The subterranean energy storage system of claim 7, wherein the second controllable access includes an upper second controllable access and a lower second controllable access;

wherein the first controllable access includes an upper first controllable access and a lower first controllable access;

wherein the turbine is a pump-as turbine (PAT) and includes an upper PAT and a lower PAT;

wherein the lower first controllable access is located within the fluid channel shallower than the one-directional valve;

wherein the lower PAT is located within the fluid channel shallower than the lower first controllable access;

wherein the upper first controllable access is located within the fluid channel shallower than the lower PAT;

wherein the lower second controllable access is located within the fluid channel shallower than the upper first controllable access;

wherein the upper PAT is located within the fluid channel shallower than the lower second controllable access; and wherein the upper second controllable access is located within the fluid channel shallower than the upper PAT.

10. The subterranean energy storage system of claim 5, wherein the first controllable access includes an upper first controllable access and a lower first controllable access; and wherein the system further comprises a one-directional valve within the fluid channel deeper than the upper first controllable access and shallower than the lower first controllable access, the one-directional valve configured to allow fluid to flow shallower but not deeper within the fluid channel; and wherein the lower first controllable access is located within the fluid channel shallower than the turbine.

11. The subterranean energy storage system of claim 10, further comprising a pump located within the fluid channel between the one-directional valve and the lower first controllable access, the pump configured to pump fluid in the direction of the one-directional valve.

12. The subterranean energy storage system of claim 10, further comprising a second controllable access configured to transition between an open configuration in which fluid may pass through the second controllable access between the second cavity and the fluid channel and a closed configuration in which fluid is substantially prevented from passing through the second controllable access;

wherein the first controllable access further includes a middle first controllable access;

wherein the turbine is a pump-as turbine (PAT) and includes an upper PAT and a lower PAT;

wherein the lower PAT is located within the fluid channel shallower than the bottom end of the fluid channel;

wherein the second controllable access is located within the fluid channel shallower than the lower PAT;

wherein the lower first controllable access is located within the fluid channel shallower than the second controllable access;

wherein the upper PAT is located within the fluid channel shallower than the lower first controllable access;

wherein the middle controllable access is located within the fluid channel shallower than the upper PAT;

wherein the one-directional valve is located within the fluid channel shallower than the middle controllable access;

and wherein the upper first controllable access is located within the fluid channel shallower than the one-directional valve.

13. A method for subterranean energy storage comprising:

enabling fluid to flow substantially under the influence of a pressure differential from a higher-pressured subterranean rock formation, through a fluid channel including a turbine, into a lower-pressured subterranean rock formation;

converting, in the turbine, kinetic energy of the flowing fluid into electrical energy; and pumping fluid from the lower-pressured subterranean rock formation, through the fluid channel, into the higher-pressured subterranean rock formation;

wherein the higher-pressured subterranean rock formation and the lower-pressured subterranean rock formation are substantially hydraulically isolated from each other except via the fluid channel; and wherein the higher-pressured subterranean rock formation has a higher pressure than the lower-pressured subterranean rock formation when corrected to a common depth.

14. The method for subterranean energy storage of claim 13, wherein the turbine is a pump as turbine (PAT), and wherein the pumping step is accomplished using the PAT.

15. The method for subterranean energy storage of claim 13, wherein fluid transfer between the higher-pressured subterranean rock formation and the lower-pressured subterranean rock formation is substantially blocked, except through the fluid channel.

16. The method for subterranean energy storage of claim 13, wherein the enabling step includes transitioning a first controllable access from a closed configuration in which fluid is substantially prevented from passing through the first controllable access to an open configuration in which fluid may pass through the first controllable access between the higher-pressured subterranean rock formation and the fluid channel; and wherein the pumping step includes transitioning the first controllable access from the open configuration to the closed configuration.

17. The method for subterranean energy storage of claim 16, wherein the enabling step includes flowing fluid substantially under the influence of the pressure differential from the higher-pressured subterranean rock formation, into the fluid channel through the first controllable access in the open configuration, through the turbine within the fluid channel, exiting the fluid channel through a second controllable access in an open configuration in which fluid may pass through the second controllable access between the fluid channel and the lower-pressured subterranean rock formation, and into the lower-pressured subterranean rock formation; and wherein the pumping step includes pumping fluid from the lower-pressured subterranean rock formation into the fluid channel through the second controllable access in the open configuration, past the first controllable access in the closed configuration, exiting the fluid channel through a one-directional valve, and into the higher-pressured subterranean rock formation.

18. The method for subterranean energy storage of claim 17, wherein the turbine is a pump as turbine (PAT), and wherein the pumping step is accomplished using the PAT and using a pump located within the fluid channel between first controllable access and the one-directional valve.

19. The method for subterranean energy storage of claim 17, wherein the second controllable access includes an upper second controllable access and a lower second controllable access;

wherein the first controllable access includes an upper first controllable access and a lower first controllable access;

wherein the turbine is a pump-as turbine (PAT) and includes an upper PAT and a lower PAT;

wherein the enabling step includes flowing fluid substantially under the influence of a pressure differential from the higher-pressured subterranean rock formation, into the fluid channel through one of the upper first controllable access in the open configuration and the lower first controllable access in the open configuration, the other of the upper first controllable access and the lower first controllable access being in the closed configuration, through at least one of the upper PAT and lower PAT within the fluid channel, exiting the fluid channel through the upper second controllable access in the open configuration or the lower second controllable access in the open configuration, and into the lower-pressured subterranean rock formation; and wherein the pumping step includes pumping fluid from the lower-pressured subterranean rock formation into the fluid channel through at least one of the upper second controllable access in the open configuration and the lower second controllable access in the open configuration, past the upper first controllable access in the closed configuration, past the lower first controllable access in the closed configuration, exiting the fluid channel through the one-directional valve, and into the higher-pressured subterranean rock formation.

20. The method for subterranean energy storage of claim 16, wherein the first controllable access includes an upper first controllable access and a lower first controllable access;

wherein the enabling step includes flowing fluid substantially under the influence of the pressure differential from the higher-pressured subterranean rock formation, into the fluid channel through the lower first controllable access in the open configuration, through the turbine within the fluid channel, exiting the fluid channel through an open bottom end of the fluid channel, and into the lower-pressured subterranean rock formation; and wherein the pumping step includes pumping fluid from the lower-pressured subterranean rock formation into the fluid channel through the open bottom end, past the lower first controllable access in the closed configuration, through a one-directional valve, exiting the fluid channel through the upper first controllable access in the open configuration, and into the higher-pressured subterranean rock formation.

21. The method for subterranean energy storage of claim 20, wherein the turbine is a pump as turbine (PAT), and wherein the pumping step is accomplished using the PAT and using a pump located within the fluid channel between lower first controllable access and the one-directional valve.

22. The method for subterranean energy storage of claim 20, wherein the turbine is a pump-as turbine (PAT) and includes an upper PAT and a lower PAT;

wherein the first controllable access further includes a middle first controllable access and a lower first controllable access;

wherein the enabling step includes flowing fluid substantially under the influence of the pressure differential from the higher-pressured subterranean rock formation, into the fluid channel through one of the middle first controllable access in the open configuration and the lower first controllable access in the open configuration, the other of the middle first controllable access and the lower first controllable access being in the closed configuration, through at least one upper PAT and the lower PAT within the fluid channel, exiting the fluid channel through the open bottom end of the fluid channel or a second controllable access in an open configuration in which fluid may pass through the second controllable access between the fluid channel and the lower-pressured subterranean rock formation, and into the lower-pressured subterranean rock formation; and wherein the pumping step includes pumping fluid from the lower-pressured subterranean rock formation into the fluid channel through at least one of the open bottom end and the second controllable access in the open configuration, past the lower first controllable access in the closed configuration, past the middle controllable first access in the closed configuration, through the one-directional valve, exiting the fluid channel through the upper first controllable access in the open configuration, and into the higher-pressured subterranean rock formation.

* * * * *